(No Model.)
B. MEIER.
BELT STRETCHER.
No. 436,797. Patented Sept. 23, 1890.
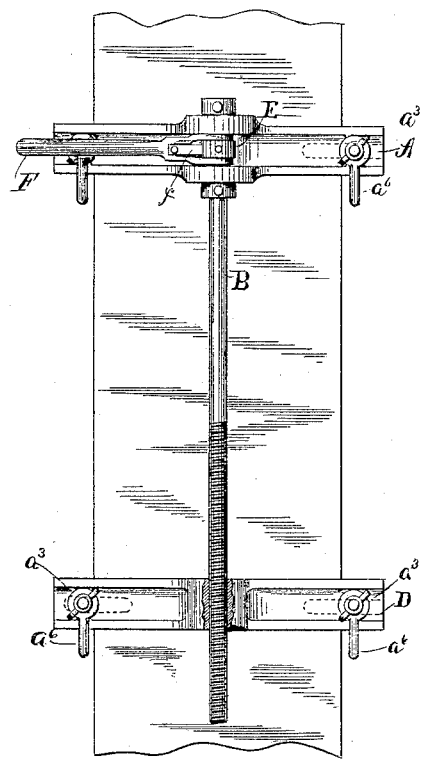
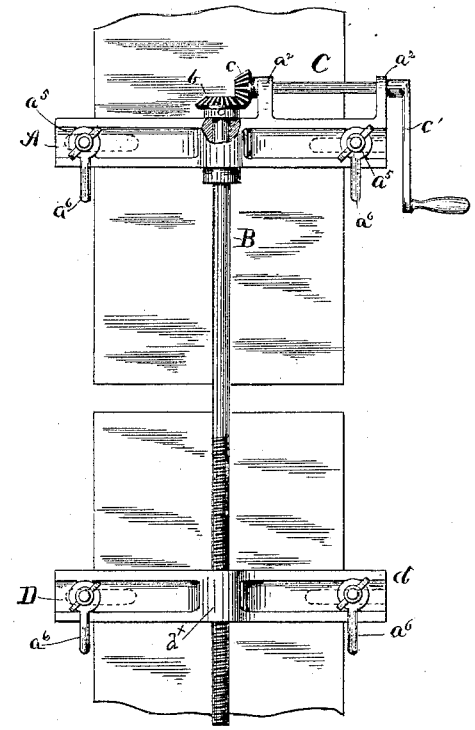
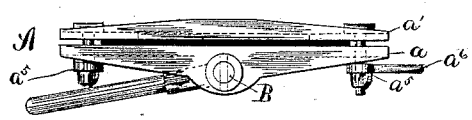
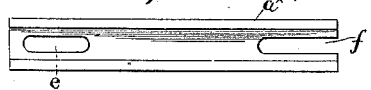
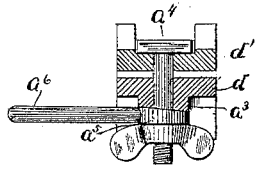
Witnesses
A. H. Opsahl
Emma F. Elmore
Inventor,
Beat Meier
By his Attorneys
Williamson & Blodgett
THE NORRIS PETERS CO., PHOTO-LITHO., WASHINGTON, D. C.

UNITED STATES PATENT OFFICE.

BEAT MEIER, OF MINNEAPOLIS, MINNESOTA.

BELT-STRETCHER.

SPECIFICATION forming part of Letters Patent No. 436,797, dated September 23, 1890.

Application filed February 8, 1890. Serial No. 339,713. (No model.)

*To all whom it may concern:*

Be it known that I, BEAT MEIER, a citizen of the United States, residing at Minneapolis, in the county of Hennepin and State of Minnesota, have invented certain new and useful Improvements in a Device for Adjusting and Tightening Belts; and I do hereby declare the following to be a full, clear, and exact description of the invention, such as will enable others skilled in the art to which it appertains to make and use the same.

My invention relates to devices for adjusting and tightening belts around their supporting-pulleys; and it comprises clamps to which the parts of the belt are attached, and by which they can be pulled together and secured until they are properly attached by riveting, sewing, or in any other desirable manner. One of the clamps is stationary, while the other is movable. It often happens that belts become stretched by constant use, or become torn or otherwise injured, and therefore need tightening or repairs; and it is important to do this work without removing the belts from their supporting-pulleys. With my invention these results are accomplished with facility and ease in the following manner: The stationary clamp is mounted between two collars at the upper end of a shaft, and is composed of two sections, one of which is fixed and is provided on its outer surface with circular cams, while the other has an oblong closed slot in one end and an open slot in its opposite extremity. Bolts headed at one end and provided with thumb-nuts at the other are passed through the sections of the clamp, and around each bolt is placed a circular cam having an inclined face, which is opposed to the cam-face on the clamp, and an extension or lever. The upper end of the shaft has a bevel, ratchet, or other equivalent form of gear, while its lower portion is threaded and enters a threaded perforation in the movable part of the clamp. When a belt needs shortening, the clamps of the implement are secured thereto and the screw is turned to bring the parts of the belt toward each other and hold them in such position until a piece of the desired size is cut out, and when it needs patching the clamps are adjusted in the same manner on each side of the injured portions and the parts are held in the proper positions until repairs are made. So, too, when a new belt is to be fitted over its supporting-pulleys the implement is employed in the same manner to draw the ends of the belt toward each other and to retain them in position until properly secured.

In the accompanying drawings, in which like symbols refer to like parts throughout the several views, Figure 1 is a plan view of the device, shown as in position for use upon a belt. Fig. 2 is a side view of one of the clamps. Fig. 3 is a plan view of one of the lower plates or jaws of the clamps. Fig. 4 is a plan view of a modified arrangement, in which a ratchet-wheel and pawl-lever are shown as employed as a substitute for the gearing represented in Fig. 1. Fig. 5 is a view of the screw and ratchet-wheel. Fig. 6 is a cross-section of the clamp.

A is a clamp composed of two sections $a\,a'$, part $a$ of which is fitted between collars at the upper end of a shaft B. Rising from this part $a$ are bearings $a^2\,a^2$, in which a shaft C, provided with a bevel-gear $c$ at one end and a crank $c'$ at the other, is mounted. On the end of shaft B is a bevel-gear $b$, which intermeshes with gear $c$.

D is a similar clamp mounted at the lower end of bolt B and composed of two sections $d\,d'$. Section $d$ is provided with a raised portion $d^x$, having a threaded opening or nut for receiving screw B. On sections $a$ and $d$ are raised circular surfaces $a^3$, having inclined or cam-shaped faces, and mounted on securing-bolts $a^4$ are reversely-arranged cams $a^5$, having actuating-levers $a^6$. The lower plate of each clamp is provided with a closed oblong slot $e$ near one end and with an open slot $f$ at the other, in virtue of which construction the plate can be moved longitudinally a sufficient distance to withdraw its open slotted end from the securing-bolt, when it can be swung to one side to permit the device to be placed in position on the belt. After the device is applied to the belt the section $a'$ is returned to its clamping position and the hand-levers $a^6$ are turned to force the parts of the clamp tightly upon the belt.

In the modification represented in Fig. 5 a ratchet-wheel E is shown as substituted for the arrangement of gearing represented in Fig. 1, and a lever F, having a pawl $f$, is employed for actuating said wheel. Otherwise the parts are precisely the same and operate in the same manner as in the arrangement illustrated in the other figures.

It will be observed that the back portion of each of the jaws $a$ $a'$ is grooved to provide raised flanges $a^\times$ $a^\times$, between which the squared heads of bolts $a^4$ are received, thus forming locking-seats, which prevent the bolts from turning. It will also be apparent that by forming the bearing and nut for the screw-shaft in raised portions of the clamp-jaws all liability of interference of the belt being stretched with the screw is avoided.

The device is especially useful with wide belts, and by grasping the belt along its entire width its sections can be pulled toward each other evenly and with no danger of wrinkling or puckering.

I have shown the faces of the clamp-sections as smooth or plain faced; but it is obvious that they could be either roughened or provided with teeth to enable them to take a firm grip on the belt, if deemed advisable.

Having thus described my invention, what I claim is—

In a belt-stretcher, the combination, with the single shaft having a non-threaded portion and a threaded portion, as described, of a pair of clamps provided with a raised central bearing mounted on the upper end of the shaft, a second pair of clamps, one member of which is provided with an internally-threaded projection which receives the threaded portion of the shaft, bolts having square heads fitted between ribs on one member of each pair of clamps, securing-nuts therefor, cams on the other member of each pair of clamps, and levers having cams, substantially as set forth.

In testimony whereof I affix my signature in presence of two witnesses.

BEAT MEIER.

Witnesses:
WM. H. BLODGETT,
FRANK D. MERCHANT.